(12) United States Patent
Smythe, Jr.

(10) Patent No.: US 8,793,949 B2
(45) Date of Patent: Aug. 5, 2014

(54) DRYWALL FINISHING SYSTEM

(71) Applicant: Timothy D. Smythe, Jr., Bend, OR (US)

(72) Inventor: Timothy D. Smythe, Jr., Bend, OR (US)

(73) Assignee: Structure Building Technologies, Inc., Bend, OR (US)

( * ) Notice: Subject to any disclaimer, the term of this patent is extended or adjusted under 35 U.S.C. 154(b) by 0 days.

(21) Appl. No.: 13/931,443

(22) Filed: Jun. 28, 2013

(65) Prior Publication Data

US 2014/0026503 A1    Jan. 30, 2014

Related U.S. Application Data

(63) Continuation of application No. 12/959,202, filed on Dec. 2, 2010, which is a continuation of application No. 11/176,952, filed on Jul. 7, 2005, now abandoned, which is a continuation of application No. 10/200,478, filed on Jul. 20, 2002, now abandoned, which is a continuation of application No. 09/715,614, filed on Nov. 17, 2000, now abandoned, which is a continuation of application No. 09/191,861, filed on Nov. 12, 1998, now Pat. No. 6,148,573, which is a continuation-in-part of application No. 08/832,470, filed on Apr. 2, 1997, now abandoned, which is a continuation-in-part of application No. 08/718,137, filed on Sep. 18, 1996, now abandoned, said application No. 08/832,470 is a continuation-in-part of application No. 08/544,339, filed on Oct. 17, 1995, now abandoned, said application No. 08/718,137 is a continuation-in-part of application No. 08/544,339.

(51) Int. Cl.
*E04B 2/00* (2006.01)

(52) U.S. Cl.
USPC .......................................... 52/287.1; 52/288.1

(58) Field of Classification Search
USPC .................... 52/254, 255, 287.1, 288.1, 746.1
See application file for complete search history.

(56) References Cited

U.S. PATENT DOCUMENTS

| | | | | | |
|---|---|---|---|---|---|
| 3,109,207 | A | * | 11/1963 | Cooper | 52/255 |
| 4,024,684 | A | * | 5/1977 | Holmgren | 52/127.2 |
| 4,719,732 | A | * | 1/1988 | Bernard | 52/287.1 |
| 5,368,907 | A | * | 11/1994 | Conboy | 428/43 |
| 5,604,001 | A | * | 2/1997 | Schold | 428/41.8 |
| 6,148,573 | A | * | 11/2000 | Smythe, Jr. | 52/255 |
| 7,214,434 | B2 | * | 5/2007 | Dalgleish et al. | 428/537.5 |

* cited by examiner

*Primary Examiner* — Jeanette E Chapman
*Assistant Examiner* — Daniel Kenny
(74) *Attorney, Agent, or Firm* — Clifford Kraft

(57) ABSTRACT

A drywall finishing system for finishing 1) normal inside and outside corners of any angle, 2) stub wall or closet corners, 3) window wrap corners, and 4) L-metal for window sills and areas where drywall ends against some other surface like brick. The finishing system comprises a preformed trim piece comprising a semi-rigid member that is relatively thick in the center and tapers laterally to a thin edge. A layer of paper is bonded to the inside surface of the semi-rigid member for receiving joint compound to continuously bond the trim piece to the dry wall; this paper layer can optionally have a layer of adhesive material on its outer surface. A layer of finishing material is bonded to the exterior surface of the semi-rigid member.

3 Claims, 9 Drawing Sheets

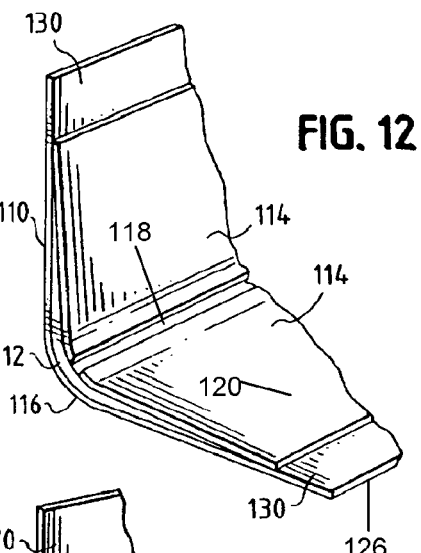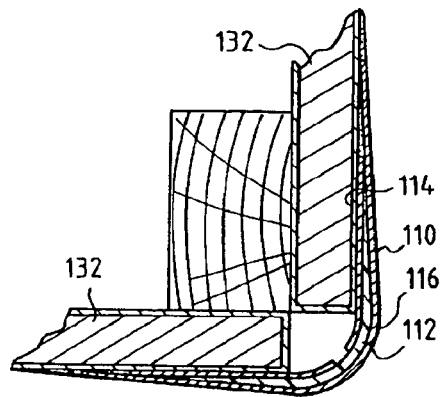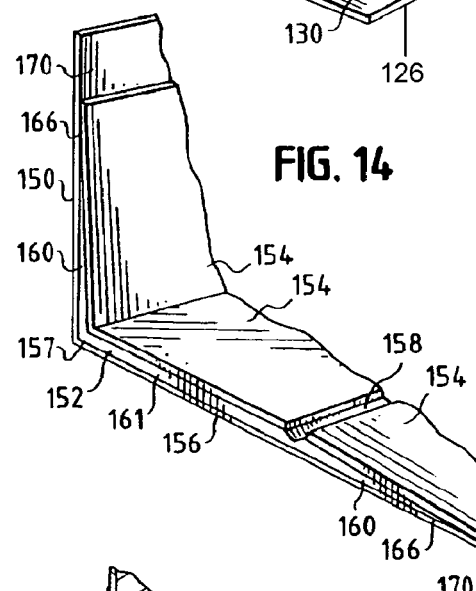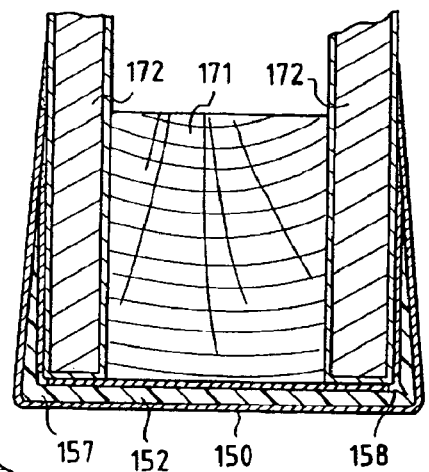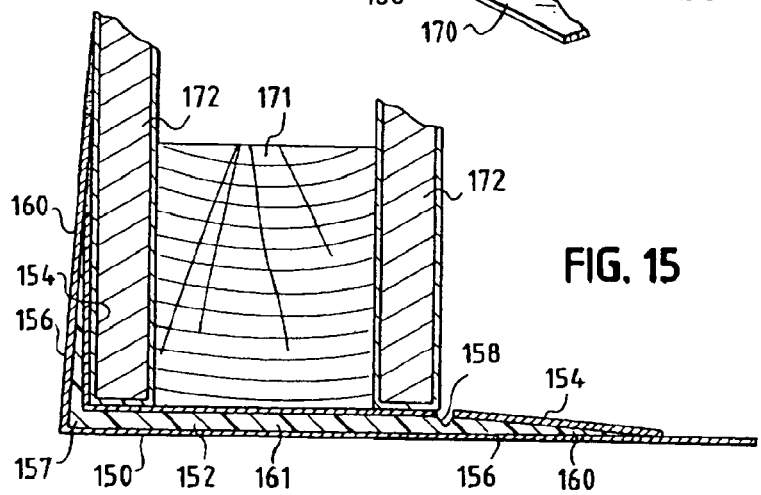

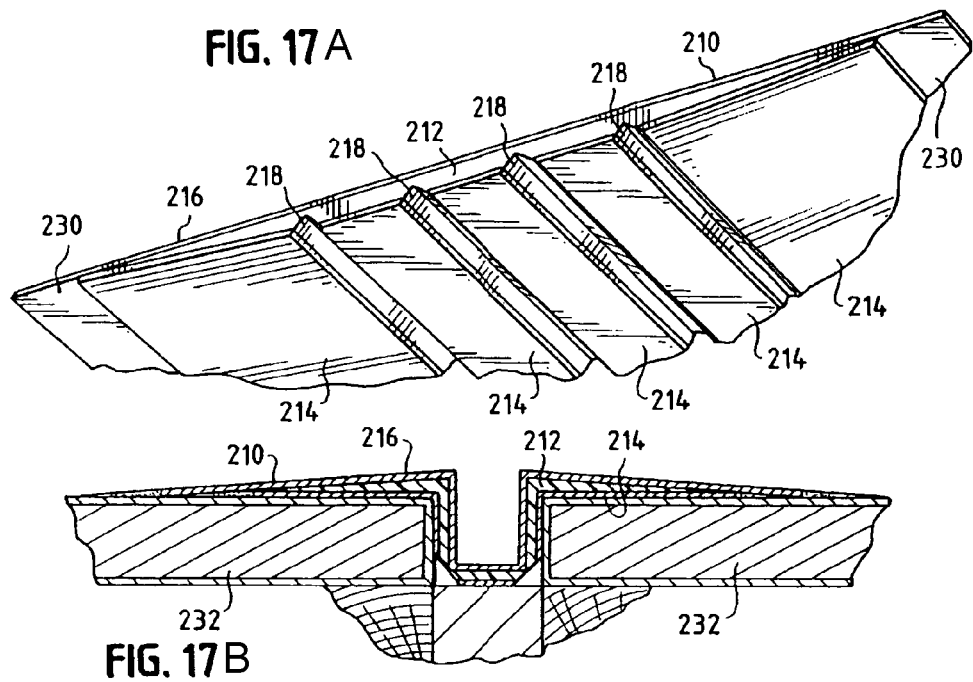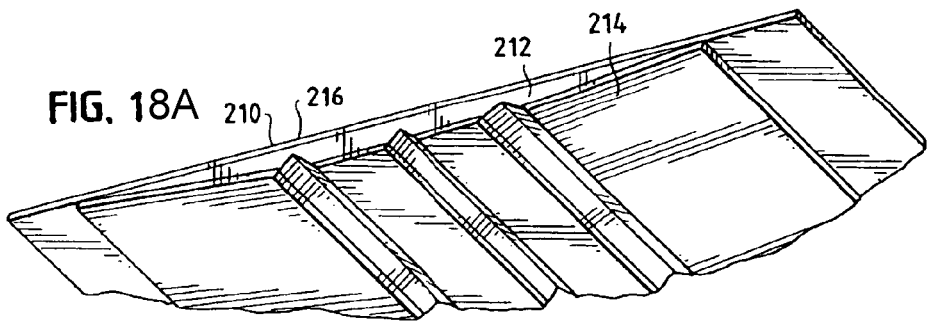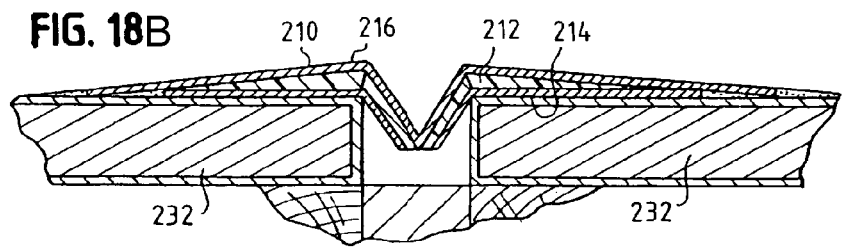

500
501

500   501
503   502

DRYWALL FINISHING SYSTEM

This application is a continuation of application Ser. No. 12/959,202 filed Dec. 2, 2010 which was a continuation of application Ser. No. 11/176,952 filed Jul. 7, 2005, now abandoned which was a continuation of application Ser. No. 10/200,478 filed Jul. 20, 2002, now abandoned, which was a continuation of application Ser. No. 09/715,614 filed Nov. 17, 2002, now abandoned, which was a continuation of application Ser. No. 09/191,861 filed Nov. 12, 1998, now U.S. Pat. No. 6,148,573 issued Nov. 21, 2000. Application Ser. No. 09/191,861 was a continuation-in-part of application Ser. No. 08/832,470 filed Apr. 2, 1997, now abandoned, and was also a continuation-in-part of application Ser. No. 08/718,137 filed Sep. 18, 1996, now abandoned. Both application Ser. Nos. 08/832,470 and 08/718,137 were continuations-in-part of a single parent application Ser. No. 08/544,339 filed Oct. 17, 1995, now abandoned.

BACKGROUND

1. Field of the Invention

This invention relates generally to the field drywall construction and more particularly to a system of exterior and interior drywall seams and corners that greatly reduces the amount of time, labor and material required to finish a modem structure.

2. Description of Related Art

The use of gypsum drywall board in modern construction is well known. Manufactured drywall sheets are nailed to studs to form interior walls and ceilings. Before these sheets can be painted or textured, the joints must be taped and sealed with joint sealing compound (drywall mud). Drywall tape is a porous fibrous material, usually paper, which is designed to permanently bond with drywall mud.

Taping also (known as stringing) is a tedious process. First, mud and tape must be applied by hand or dispensed with a tool known as a bazooka. The worker rolls and glazes the tape while the mud is wet. As the tape strings out, it has a tendency to pull in the direction of motion. After the tape is applied, it is coated with additional mud and the edges are feathered with a wide blade drywall knife to form a smooth transition between the seam and the wall. The mud is then allowed to dry, typically overnight. Next, the seam is sanded, recoated with mud, dried and sanded again. The process is repeated if necessary until a smooth seam is produced.

Corners present a special problem. Inside corners are finished using drywall tape in much the same manner as flat joints. Outside corners are typically finished with corner beads.

Corner beads are either sharp edged or rounded nose, also known as "bullnose." These are used on exterior corners at windows and other openings. To use a standard corner bead, it first must be cut from a standard length of 8 feet or 10 feet. The bead is nailed into position using short nails approximately every foot. The worker must: 1) keep the bead plumb or level, and 2) keep the bead at the proper angle to prevent slipping too far to one side or the other. If this latter condition occurs, a "shiner", as it is called in the trade, results. This is where the bead is too far toward one side of the corner making the other side flange hard to coat.

Once the bead is installed, the worker must "first coat" the bead. This means to coat it with mud for the first time. This is very labor intensive, and it uses a large amount of mud. The bead projects outwardly from the corner. Accordingly, when first coat is applied a wedge of mud is formed which is thickest at the bead and tapers out to meet the wall. After the first coat, the mud is allowed to dry. Drying takes about a day.

After the "first coat" is dry throughout the building, the worker has to sand this first coat of mud and clean all the metal edges. This is especially difficult with bullnose bead. After the "first coat" is sanded, the worker proceeds to "second coat" the bead repeating the entire process again and waiting another day to dry. The worker finally must again sand the bead carefully looking for imperfections, and touching these up. At this point, the bead is ready for texture or paint. The entire process uses considerable mud, and is very labor intensive, especially the sanding. In terms of total construction time, it requires two to three days to complete all the corners of a typical residence.

An alternative to fixed corner beads, especially for corners that do not meet at 90 degrees is a product known as "flex bead." Flex bead consists of two thin strips of metal bonded to a two inch paper tape. To use "flex bead", a worker first spreads all-purpose mud along the wallboard on both sides of the angle. A length of "flex bead" is folded by hand to create a crease. The bead is then installed in the angle. This requires a good eye for straight lines since the "flex bead" will not make a straight line by itself. The worker must move the bead around to the best of his abilities to set it as straight as possible. On many occasions, the worker will end up with a line that is not straight; this condition is called "snaking".

Once the "flex bead" is installed and dry, the first coat procedure is started. Most journeymen only coat one side of the angle at a time. If one tries to coat both sides at the same time, the mud flops over to the other side, and the knife digs a line into the mud on the other side of the angle. Therefore, the following process is usually used: 1) Apply a first coat of mud to one side and wait until it is dry; 2) Apply a first coat of mud to the other side and wait until it is dry; 3) Sand both sides and clean at the crease; 4) Apply a second coat of mud to one side and wait until it is dry; 5) Apply a second coat of mud to the other side and wait until it is dry; 6) Sand and touch up both sides. This process is tedious, and requires considerable time while the respective sides are drying. Accordingly, considerable drawbacks remain unsatisfied.

What is badly needed is a system for finishing drywall on the interior of buildings that avoids the difficulties of taping, corner beads and "flex bead" while retaining the perfect finished appearance that is required for texturing or painting. The sanding steps should be reduced or eliminated. This system should reduce the labor to less than one day for a typical residence and significantly reduce the amount of mud used.

SUMMARY OF THE INVENTION

The present invention relates to a drywall finishing system for finishing 1) inside and outside corners of any angle, 2) stub, end or closet walls, 3) window wrap corners, and 4) L-member for window sills and areas where a drywall ends against another surface e.g. brick. In addition, the system includes accessory products for each of the pieces mentioned.

The drywall finishing system of the invention in its most basic form is an elongated, preformed trim piece comprising a semi-rigid member having two flanges and inner and outer surfaces. The inner surface is provided with bonding means for continuously bonding the semi-rigid member to the drywall. The outer surface of the finishing member is provided with finishing means adapted to receive paint or other texture. The flanges of the semi-rigid member are tapered in a lateral direction, being thickest at the center and tapering to a thin edge.

A first preferred embodiment is a flexible trim piece, comprising a semi-ridged member having two flanges, each of the flanges being tapered to a thin lateral edge. The semi-rigid member has a longitudinal groove between the flanges forming a hinge. A covering material is bonded to the inside surface of the semi-rigid member. The covering material is preferably drywall tape for forming a good continuous bond with drywall mud between the trim piece and the drywall. A finishing material is bonded to the exterior surface of the semi-rigid member. The finishing material is preferably a fibrous material such as a paper which is suitable for directly receiving paint or other texture. The finishing material may desirably extend laterally beyond the respective side edges of the semi-rigid member forming side tabs.

To install the first embodiment of the invention, a length of preformed trim piece is selected from stock and cut to length if not exactly the right length. A flat coat of mud is applied to both sides of a drywall corner. The preformed piece is folded at the groove to match the corner, and placed over the mud and smoothed into place. Since the trim piece of the invention is preformed, the piece makes a straight line at the required angle. Once, the piece is in place, the edges are feathered or "killed" once with a small amount of mud and a wide drywall blade or knife. At that point the corner is complete except for drying. It requires little or no sanding. After the mud has dried, the finishing material can be directly textured or painted.

The present invention is placed on top of a coat of applied mud at the corner. The corner can be an exterior or interior angle. No nails are required, since the invention pieces stick to the mud. The exterior finishing material is paper, plastic, or other suitable material for receiving texture or paint. The present invention eliminates most of the intense labor associated with present methods since none of the parts need to be coated with mud or sanded. In addition, the parts form straight, finished lines and angles as soon as they are installed.

Additional embodiments of the invention include right angle outside corner trim pieces, bullnose outside corner trim pieces, stub or end wall trim pieces, U-shaped and V-shaped joint pieces, and other trim and specialty pieces.

These advantages and other advantages of the present invention will become more fully apparent from the following detailed description when read in conjunction with the accompanying drawings

BRIEF DESCRIPTION OF THE DRAWINGS

For a more complete understanding of this invention, reference should now be made to the embodiments illustrated in greater detail in the accompanying drawings and described below by way of examples of the invention.

FIG. 12 is a perspective view of a third embodiment of the invention comprising an outside right angle bullnose corner piece.

FIG. 13 is a cross-section of the third embodiment of the invention applied to an outside corner.

FIG. 14 is a perspective view of a fourth embodiment of the invention comprising an end wall trim piece.

FIG. 15 is a cross-sectional view of the fourth embodiment partially applied to an end stub wall.

FIG. 16 is a cross-sectional view of the fourth embodiment fully applied to an end wall.

FIG. 17A is a perspective view of a fifth embodiment of the invention comprising a U-shaped joint trim piece.

FIG. 17B shows a cross-section.

FIG. 18A is a cross-sectional view of the fifth embodiment applied to a V-shaped joint.

FIG. 18B shows a cross-section.

It should be noted that many of the figures show exaggerated features such as the thickness of various members and materials. This is necessary to adequately describe and point out the features and advantages of the present invention.

DETAILED DESCRIPTION

Description of Prior Art

Figure 1:
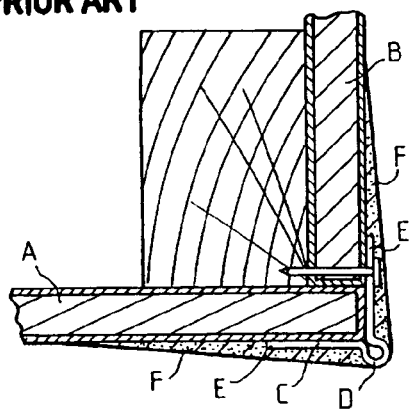
FIG. 1 is a cross-section through a prior art outside corner bead.
Figure 2:
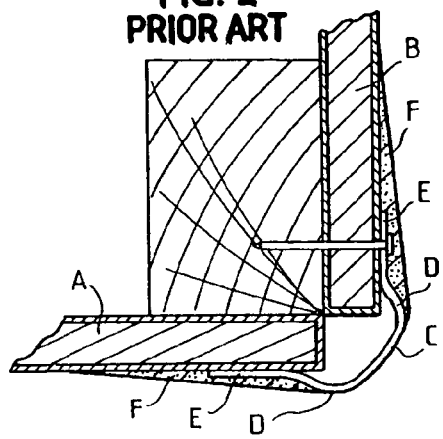
FIG. 2 is a cross-section through a prior art bullnose outside corner bead.
Figure 3:
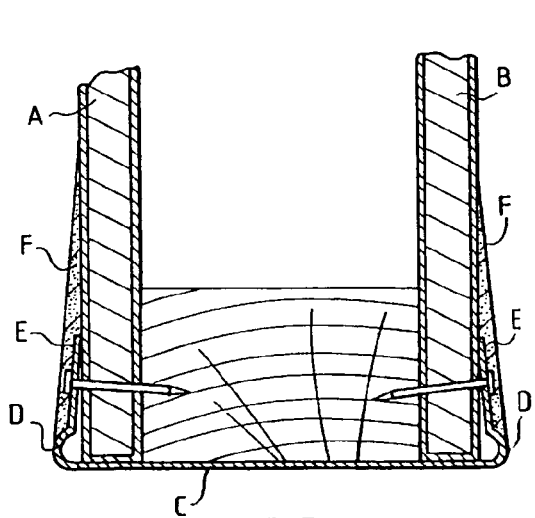
FIG. 3 is a cross-section through a prior art end wall.

FIGS. 1-3 illustrate prior art drywall corner finishing systems. FIG. 1 shows a conventional right-angle sharp corner bead. Drywall pieces A and B join to form a corner. Corner bead C comprises bead D projecting outwardly from the wall, and two flanges E which are nailed to the drywall. A triangular wedge of drywall joint compound or mud F is formed between the drywall surfaces A and B and bead D covering flanges E. The wedges F are formed by applying a first coat of mud over the corner bead C and adjacent portions of drywall A and B. The first coat is applied with a wide flat blade drywall knife. The blade rides along bead D at an angle to the wall and spaced outwardly from flanges E. This results in a deposit of a thick layer of mud over the flanges. Because the layer is thick it requires an extended drying time, typically over night. Moreover, the thick layer will tend to experience shrinkage and cracking while drying.

After the layer has dried, it is rough sanded. Next, a second or finish coat of mud is applied over the first coat to fill any cracks, holes or other irregularities in the first coat. The finish coat is allowed to dry. Afterwards, the finish coat is fine sanded. Occasionally a second finish coat is required, followed by another fine sanding. The process of finishing the corner may take two or three days. The time, labor and material quantities and attendant cost required to build the corner are directly proportional to the volume of mud that forms wedges F.

FIG. 2 shows a conventional bullnose corner. The bullnose corner of FIG. 2 differs from the corner bead of FIG. 1 primarily in the radius of the corner member C. The reference letters A-F in FIG. 2 correspond to the same technical features discussed in reference to FIG. 1. One difference is that in the case of the bullnose corner two distinct ridge lines D are formed where the mud F meets the corner bullnose piece C. There is a significant arc of exposed bullnose between the two ridge lines. When finishing a bullnose corner, excess mud is commonly deposited on this exposed arc. It is thus necessary to sand the exposed arc to remove the excess mud. As with the sharp corner bead, thick wedges of mud F are built up on both sides of the corner member at significant labor and material costs. A further problem encountered with prior art corners is that cracks commonly form at the edge of the flange E, especially if the corner is banged for any reason. Traditional bullnose corners also show a ridge lines D which are esthetically detracting. Cracks detract from the appearance of the corner.

FIG. 3 shows a conventional stub wall or closet wall piece. Again, the reference letters A-F in FIG. 3 refer to the corresponding structure previously discussed in reference to FIGS. 1 and 2. The end wall or closet member suffers the same drawbacks as the bullnose corner. Indeed, there is an ever greater surface area between ridge lines D that must be sanded to remove excess mud.

The primary drawbacks of the prior art are: (1) the labor and material costs necessary to build and finish the wedge of mud F between the member C and the drywall; (2) the significant time required to allow the mud to dry between applications, i.e., two to three days; and (3) the propensity for cracking along the edge of the flange E and the showing of ridge lines D. Each of these long standing problems in the prior art are solved by the product and method of the invention.

DESCRIPTION OF PREFERRED EMBODIMENTS

Figure 4:
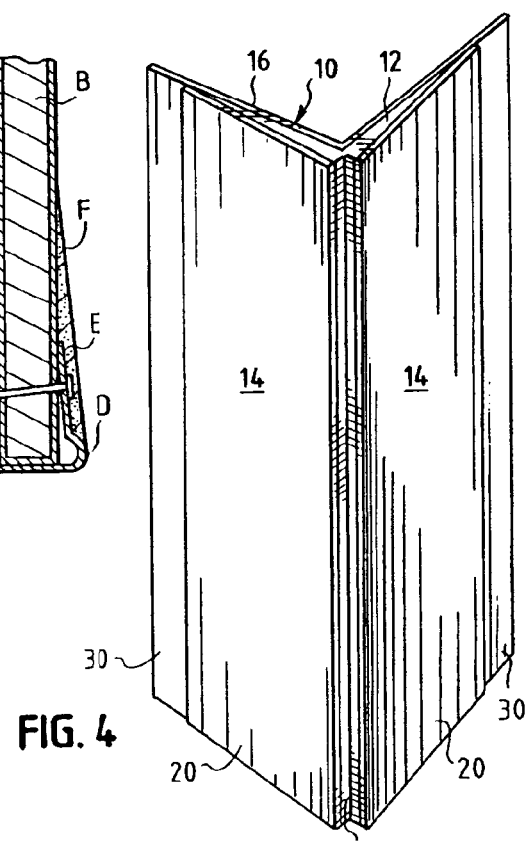
FIG. 4 is an end and interior perspective view of a first embodiment of the invention comprising a flexible corner trim piece.
Figure 5A:
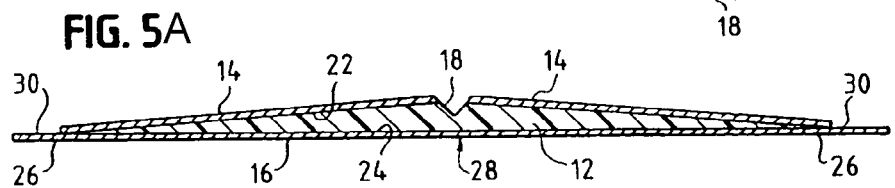
FIG. 5A is a cross-section of the first embodiment of the invention.
Figure 5B:
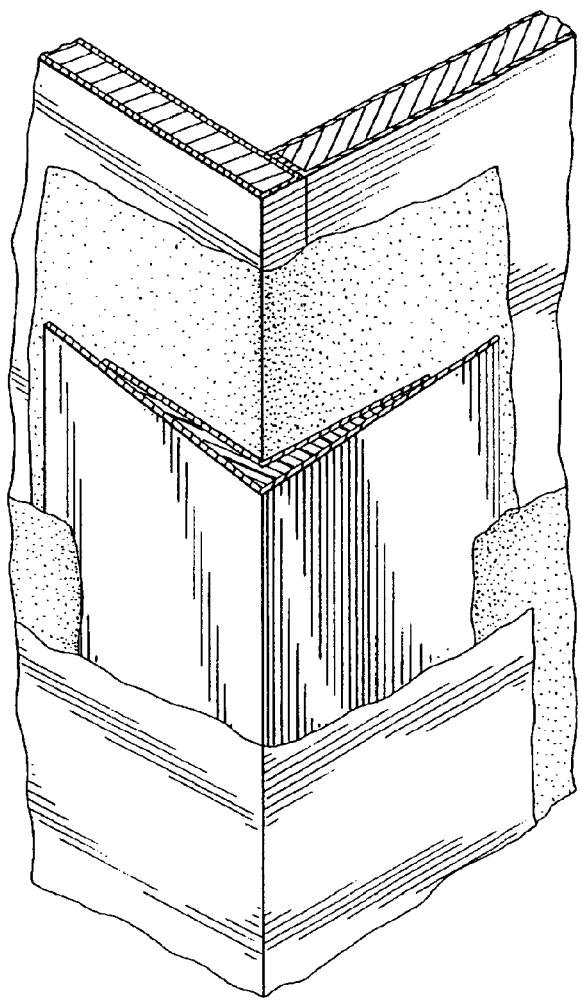
FIG. 5B is the piece from FIG. 5A on a wall.
Figure 5C:
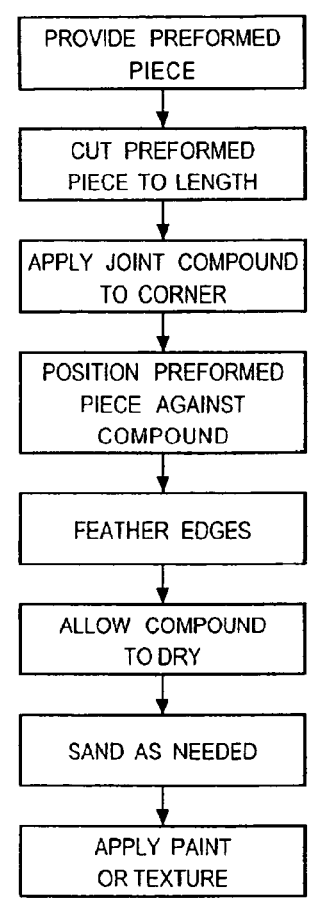
FIG. 5C is an installation chart.

Referring to FIGS. 4 and 5, a first embodiment of the present invention, that will be called "Ultra-Flex", is seen generally at 10. This embodiment can be used for inside or outside corners. Its construction is that of an elongated semi-rigid member 12 with an interior layer of covering material 14 and an exterior layer of finishing material 16 laminated thereto. The semi-rigid member 12 can be plastic, metal, or other flexible, but strong material, with high impact plastic such as that used to construct modern cola bottles being preferred. The member can be supplied in 10 or 12 foot lengths, or any other convenient length, or it can be supplied on a roll of 100 feet or any other convenient length. Running the length of the member is a groove 18. The groove divides the piece into two flanges 20 that can be repeatedly bent to form any angle from about 15 degrees to about 345 degrees. In this manner, the piece can be bent to match any inside or outside corner. The elongated semi-rigid member has a first or inside surface 22 that is split into a left part and a right part by the groove 18. It also has a second or exterior surface 24 that is continuous (the groove 18 does not penetrate all the way through). The semi-rigid member is preferably laterally tapered from a maximum thickness near the groove 18 to a minimum thickness near lateral edges 26. The maximum thickness can be between 10 mil and 120 mil near the groove and between 2 mil and 60 mil at the edges with the thickness at the edges always being less than the thickness near the center. The preferred maximum thickness is at least 54 mil, and the preferred minimum thickness is less than 10 mil.

Tapering should be distinguished from the edge bevel. The object of tapering is to form an elongated preformed wedge similar in configuration to the conventional wedges of drywall mud built in situ. See reference letter F in FIGS. 1-3.

Accordingly, the preformed, tapered semi-rigid member replaces the labor intensive, costly operations of conventional corner beads. A bevel on the other hand is an abrupt edge cut that would not materially reduce labor or material costs.

FIG. 5 is a cross-section of the "Ultra-flex" piece. The groove 18 is preferably V-shaped, and the overall cross section (without the groove) is triangular with tapering that can start anywhere. The semi-rigid member 12 gives the piece strength and support. The groove 18 forms a hinge at 28 which allows the piece to be repeatedly bent to any angle between about 15 and 345 degrees. If the material chosen for the semi-rigid member is high-impact plastic, bending does not fatigue the hinge, and the member can be bent any number of times without breaking. Also, the member in that manner is extremely strong and can resist numerous direct blows to its surface and hinge 28 without any damage.

The groove 18 separates the first surface 22 of the piece into a left half and a right half. These two halves do not have to be the same width. In fact, one of the halves can be considerably wider than the other to form an L-trim member or similar type member if desired. The first surface 22 of the semi-rigid member 12 can be covered by two strips of covering material 14 firmly bonded to the semi-rigid member 12. This covering material can be paper similar to that used on drywall, or joint tape paper, or other suitable material adapted for forming a continuous bond to drywall with mud. It should be noted that adhesive other than drywall mud could be used to attach the present invention to drywall; however, the preferred method is to use only drywall mud. Also it should be noted that the groove 18 can normally be formed during extrusion of the semi-rigid member 12; however, it is also possible to form it using a scoring tool or a set of male/female scoring tools. The preferred method is to extrude the semi-rigid member 12 and use an extrusion die to form the groove 18.

The second surface 24 of the semi-rigid member can be covered by a strip of finishing material 16 also firmly bonded to the semi-rigid member 12. The finishing material preferably extends laterally beyond the edges of the semi-rigid member forming side tabs 30. The side tabs 30 are adapted to be adhered to the drywall. The finishing material can be cup stock paper having an outer surface that can directly receive paint or texture. It can be any other material that can directly receive paint or texture without the need of sanding or mud.

Both the covering material and finishing material layers are bonded to the semi-rigid member. By bonded, what is meant is any process that firmly attaches the material to the member. Glue could be used, but it is preferable to extrude the entire piece with the semi-rigid member being high impact plastic. Here, the plastic with the groove and both paper layers are laminated together with the plastic being hot melted to the paper layers for a permanent bond. The groove 18 can be made with an extrusion die.

The first embodiment shown in FIGS. 4 and 5 is only one way of making this type of piece. The piece can be made with any number of grooves to form flexible specialty pieces. In particular, it can be constructed with two grooves to form a stub or end wall piece. Also, the groove can be of other suitable cross sections as required. One great advantage of this embodiment is that the groove allows the piece to be bent to form perfect corners. There is no "snaking" of the corner line, even on uneven walls or construction. Also, since this type of piece can be used at any angle, it can be used anywhere in a modem building.

It is also possible to make the first embodiment with the semi-rigid member very thin to be extra-flexible for use primarily in interior corners with angles less than or equal to 90 degrees. This embodiment may have a constant, rather than tapered, cross section. Pieces for interior angles greater than 90 degrees must be much stronger since it has been discovered that if a flexible piece is used for such an angle, the shrinkage of the mud coupled with building movement causes the entire piece to deform and shift leading to unacceptable work.

The "Ultra-Flex" and other pieces can be supplied on rolls as well as in precut lengths. In order that long pieces of the material can be put together end-to-end, it is possible in manufacture to stamp approximately 1 inch on the back of the material on one end of the product with a half cut enabling the user to peel off the plastic and back paper (or other fibrous material) leaving only the front paper (or other fibrous material). In this way pieces can be joined end-to-end seamlessly. This aspect of the invention will be further discussed in reference to FIG. 24.

Figure 6:
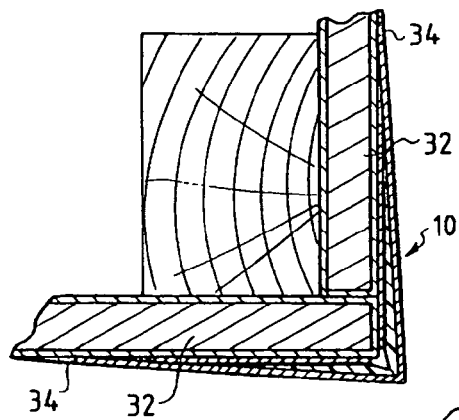
FIG. 6 is a cross-section of the first embodiment applied to a right-angle, outside drywall corner.
Figure 7:
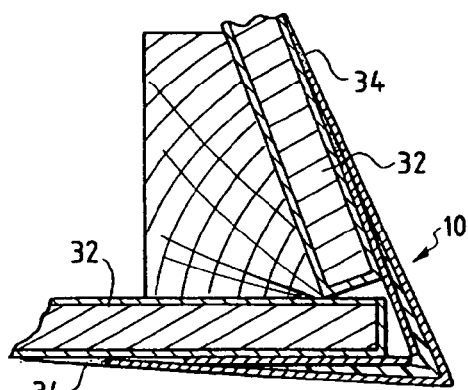
FIG. 7 is a cross-section of the first embodiment applied to an acute angle outside drywall corner.
Figure 8:
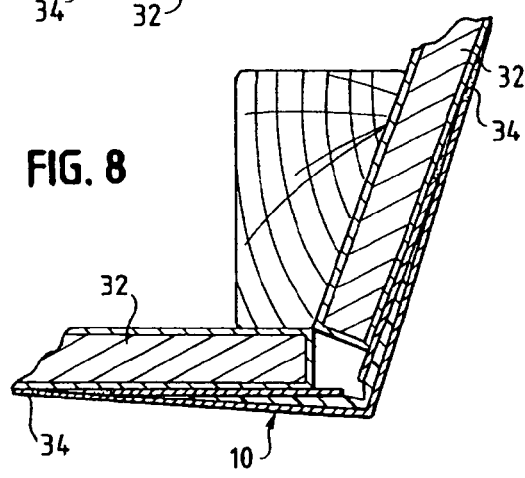
FIG. 8 is a cross-section of the first embodiment applied to an obtuse angle, outside drywall corner.
Figure 9:
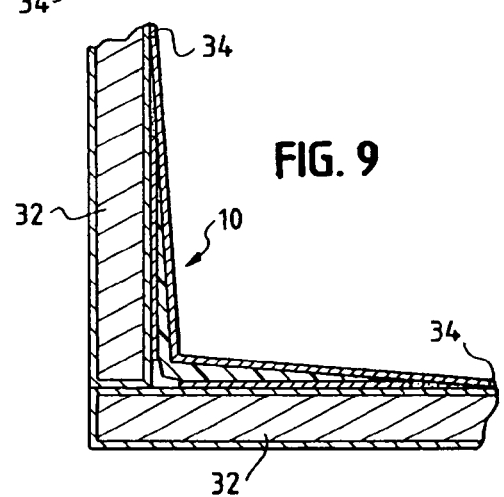
FIG. 9 is a cross-section of the first embodiment applied to an inside drywall corner.

FIGS. 6-9 illustrate the first embodiment of the trim piece of the invention applied to a variety of different drywall corners. FIG. 6 shows a right angle outside corner made with the trim piece of the invention. The trim piece 10 is applied to drywall 30 with conventional drywall compound or mud as discussed in greater detail below. The edges between the piece 10 and drywall 32 is feathered or "killed" with mud 34 to provide a smooth surface. Note, however, that there is a marked reduction in the amount of mud utilized as compared to the prior art corner FIG. 1. FIGS. 7, 8 and 9 show the same features and benefits with respect to acute, obtuse and inside corners, respectively.

A method of installing the first embodiment of the invention is as follows. A worker first applies drywall mud to both side walls of the corner to be finished. The pre-formed trim piece is cut to length and placed in the corner against the wet mud. The piece is positioned for final appearance and pressed into place; then, the excess mud can be wiped or rolled out, and finally the edges are "killed" by applying a small amount of finishing mud to the edges and smoothing them with a wide blade knife so that they merge into the surrounding drywall. There is no further finishing. When the mud dries, the corner is ready for painting or texturing. This represents a considerable savings in time and money over existing methods.

Figure 10:
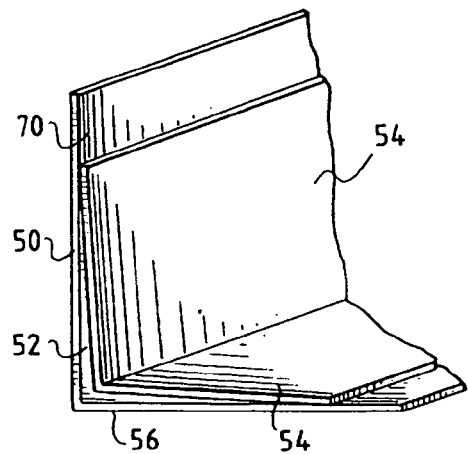
FIG. 10 is a perspective view of a second embodiment of the invention comprising an outside right angle corner piece.
Figure 11:
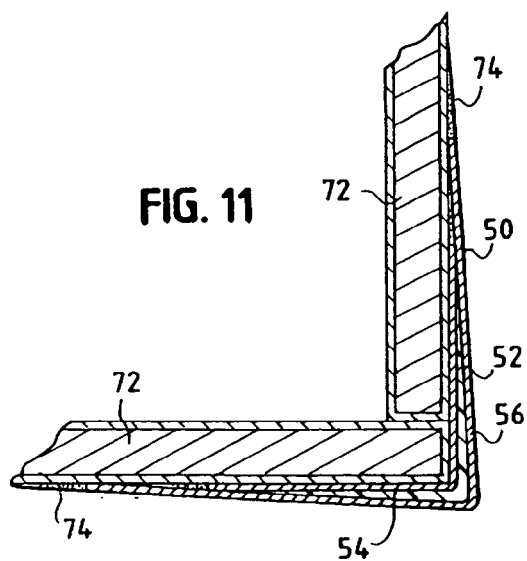
FIG. 11 is a cross-section of the second embodiment applied to an outside drywall corner.

A second embodiment is illustrated in FIGS. 10 and 11 comprising a fixed, right angle outside corner piece. The second embodiment trim piece can be constructed using the techniques discussed in relation to the first embodiment, but without the groove. The piece is made with an extruded fixed angle of near 89 degrees or any other desired angle. The angle is somewhat less than 90 degrees so the trim piece will slightly grip the dry wall and applied mud. This piece is ready to receive paint or texture and is installed by simply placing it on wet mud, aligning it correctly, pressing it into place, wiping or rolling out the excess mud, and then killing or feathering the edges with a small amount of mud. Such a piece takes the place of current exterior drywall corner pieces (see FIG. 1) leading to a perfectly sculptured preformed corner without the extreme labor associated with building up mud, sanding, and finishing conventional corners.

The right angle corner trim piece 50 comprises an elongated semi-rigid member 52 with an interior layer of covering material 54 and an exterior layer of finishing material 56. The semi-rigid member 52 is preformed with a permanent right angle between flanges 60. The flanges are each laterally tapered from a maximum thickness at the corner 58 to a minimum thickness near lateral edges 66. Tapering can start at the corner or it can start a distance away from the corner 58.

The first or inside surface of semi-rigid member 52 is covered with two strips of covering material 54 firmly bonded to the semi-rigid member as described in reference to the first embodiment. Similarly, the second or outside surface of semi-rigid member is covered with a strip of finishing material 56 also firmly bonded to the semi-rigid member. As described in reference to the first embodiment, the finishing material extends laterally beyond the edges of the semi-rigid member forming side tabs 70.

FIG. 11 shows the trim piece of the second embodiment installed on a drywall outside corner. Drywall sheets 72 form a conventional right angle, outside corner. The trim piece 50 is continuously adhered to the drywall with mud as described above. The edges between the trim piece 50 and drywall 72 are feathered with a relatively small quantity of mud 74 to provide a smooth surface. The exterior surface of the trim piece is not coated with mud, however, as was customary with prior art corner beads. Compare FIG. 11 to FIG. 1. There is a dramatic reduction in the amount of drywall mud utilized—up to 75% less mud. The reduction in the quantity of mud directly translates to corresponding dramatic reductions in the amount of drying time and labor.

FIGS. 12 and 13 illustrate a third embodiment of the trim piece 110 of the invention comprising a rounded or bullnose right angle outside corner piece. Trim piece 110, as with the first two embodiments, comprises a semi-rigid member 112 with an interior layer of covering material 114 and an exterior layer of finishing material 116 laminated thereto. The semi-rigid member 112 can be preformed with a permanent 88-90° radius 118. The exact angle is not critical and can be pre-formed to other angles encountered in the field such as 135 degrees, or any other angle. The preferred material is high impact plastic, with a uniform thickness of 0.057 inches in the radius. The radius is a true circular arc—there are no ridges or beads. The semi-rigid member 112 further comprises flanges 120 that can taper laterally from a maximum thickness at radius 118 to a minimum thickness near lateral edges 126, or can taper laterally from maximum thickness at a point slightly away from the radius 118 to a minimum thickness near lateral edges 126.

As with the first two embodiments, strips of covering material 114 are bonded to the first or interior surface of the semi-rigid member and finishing material 116 is bonded to the second or exterior surface. The finishing material extends laterally from the semi-rigid member forming side tabs 130.

FIG. 13 shows trim piece 110 installed on a right angle drywall outside corner. Trim piece 110 is continuously bonded to drywall 132 with conventional drywall mud. The edges 134 between the side tabs and drywall surface are feathered with a small amount of mud. The exterior surface of trim piece 110 is substantially free from mud and suitable for directly receiving paint or texture. Because the trim piece 112 is a true, preformed radius, there are no ridge lines as are common in the prior art. Compare FIG. 13 to FIG. 2.

FIGS. 14-16 illustrate a fourth embodiment of the trim piece 150 of the invention. Trim piece 150 is specifically adapted for end walls, such as closet openings. A normal closet opening having a top wall and two side walls will require six lengths of conventional corner bead and nine surfaces to coat with a minimum of two coats of mud. The trim piece 150 is used to finish a closet opening in a single operation.

Trim piece 150 comprises an elongated semi-rigid member 152 having an interior layer of covering material 154 and an exterior layer of finishing material 156 laminated thereto. Trim piece 150 is preformed with flanges 160, and a center portion 161 between the flanges. The flanges are each laterally tapered from a maximum thickness adjacent center portion 161 to a minimum thickness near lateral edges 166. Trim piece 150 is preformed with a permanent right angle at 157 between one flange 160 and center portion 161. Running the length of the member is a groove 158 between center portion 161 and the other flange 160. The groove 158 forms a hinge so that the other flange may be rotated relative to the center portion. In addition, there can be two grooves instead of a groove and a right angle 157. The right angle 157 can be replaced by the second groove. In this case, the piece can be made flat.

The center piece 161 can be different widths (distance between the flanges 160) depending on the construction. In the case of a 3½ inch stud and two ½ sheets of drywall, the center piece would be around 4½ inches wide. In the case of the same stud with two ⅝ sheets of drywall, the width would be around 4¾ inches. Different versions of this piece can be made for typical construction situations; specialized versions can be made for any situation. The width of the flanges 160 can be between 1 inche and 12 inches, with about 2¼ inches being preferred. The thickness of the center piece 161 can be from around 20 thousands of an inch to around ½ inch to form a finished wall. This thickness is not critical to the invention, and many other thickness are possible.

FIG. 15 shows trim piece 150 partially installed on an end wall. The end wall is formed by a stud 171 and drywall sheets 172. Trim piece 150 is installed by first applying mud continuously to both the sides and end of the end wall. The preformed corner portion of the trim piece is then pressed firmly in place. The edge between the fixed flange 160 and the drywall is feathered. Next, as shown in FIG. 16, the other flange 160 is rotated about hinge 158 and pressed into the wet mud to complete the corner. The remaining edge is feathered. Thereby, the end wall is finished in a single operation.

FIGS. 17 and 18 illustrate a fifth embodiment of the trim piece 210 invention adapted for U-shaped or V-shaped, recessed expansion joints. Expansion joints are used in many commercial buildings such as airports, hotels and shopping malls where there is a wall space large enough to raise concerns of cracking due to expansion and contraction. The U-shaped or V-shaped expansion joint commonly comprises a ½ inch square recess between two sheets of dry wall 232 as seen in FIG. 18. The fifth embodiment trim piece 210 comprises a semi-rigid member 212 with laminated covering material 214 and finishing material 216. The semi-rigid member has center portion 212 of substantially uniform thickness, between tapered flanges 220. The inside surface of the semi-rigid member is provided with four parallel grooves 218, each operating as a hinge. Thereby, the trim piece may be flexed at the grooves to conform to the expansion joint recess as shown in FIG. 18. The U-shaped or V-shaped expansion joint of FIGS. 17 and 18 can be supplied either preformed as "sticks" pre-cut to standard lengths or on rolls of around 100 feet or other convenient length.

Figure 19A:
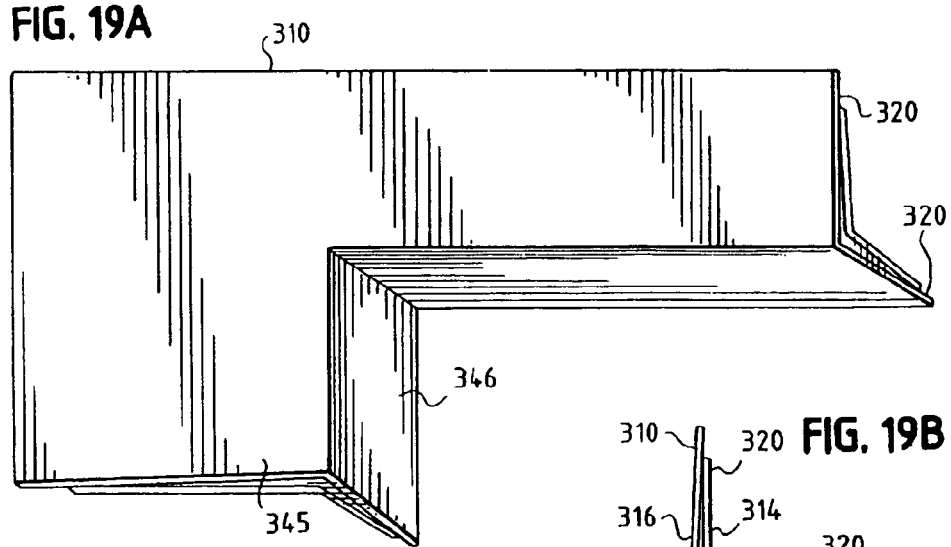
FIGS. 19A and 19B show a sixth embodiment of the invention that forms a specialty corner piece.
Figure 19B:
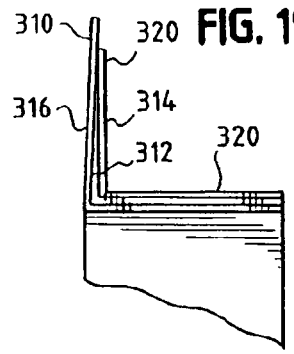

FIGS. 19A and 19B depict a sixth embodiment that forms a specialty piece 310 for corners that can be used in conjunction with the trim pieces of embodiments one through five.

The piece of 310 is shaped to be used where two right angle walls join a ceiling at an opening. Trim piece 310 preferably comprise a semi-rigid member 312 with laminated covering material 314 and finishing material 316 as described above, with two added flaps 345 and 346 of finishing material. An outer flat flap 345 fits the higher wall and extends over the opening. A second flat flap 346 runs the vertical wall forming the opening and also along the top of the inside of the opening. The angle between the wall parts 347 and the angle between the top of the opening and the wall 348 should be around 89 degrees for a right angle system; however, parts can be manufactured with any angles for special requirements or special construction angles. Trim piece 310 can be any length; however it is preferably around 7 inches along the short sides, and around 10 inches along the longer sides. The exterior corners can be straight edged as shown or bullnose (as in FIGS. 12 and 13) or other shape.

Figure 20:
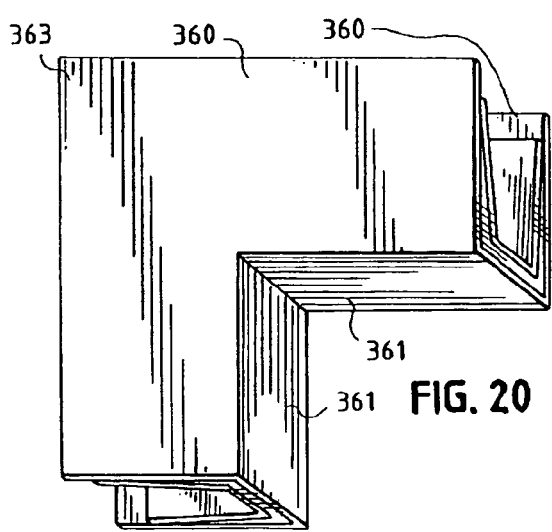
FIG. 20 shows an seventh embodiment comprising an end wall or closet specialty piece.

FIG. 20 shows a seventh embodiment comprising a specialty piece 350 to accompany the end wall piece of FIGS. 14-16. This trim piece is used where an end or closet wall meets a ceiling. The piece 350 simply continues the previous piece through the wall ceiling transition. It can be seen from FIG. 20, the flanges 360 continue the design around the transition. The center portion 161 of FIG. 14 is made to have two parts 361 at a right angle. Its dimensions are similar to those of the embodiment of FIGS. 14-16. This piece can be made entirely from plastic, paper, cardboard or any other suitable material, or its construction can be the same as the piece of FIGS. 14-16. The center portion 361 should have thickness to match that of the center portion of FIGS. 14-16 which it transitions from. As with other embodiments of the present invention, the outside corner can be sharp edged or bullnose or any other specialty shape. The outside corners 363 of the trim piece do not have to be square as shown in FIG. 3, but may be rounded to make them easier to feather. While the piece can be any dimensions, the preferred size is around 4 inches on the bases, around 2½ inches in the corners, and around 4 to 10 inches on the long sides 360. The width of center portions 361 can vary as is the case with trim pieces illustrated in FIGS. 14-16, for different types of construction.

Figure 21A:
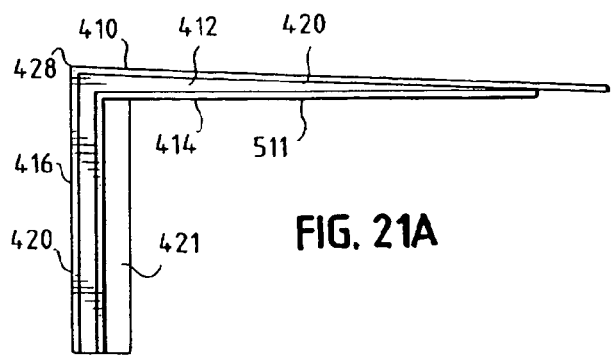
FIGS. 21A and 21B show a eighth embodiment comprising a window trim piece.
Figure 21B:
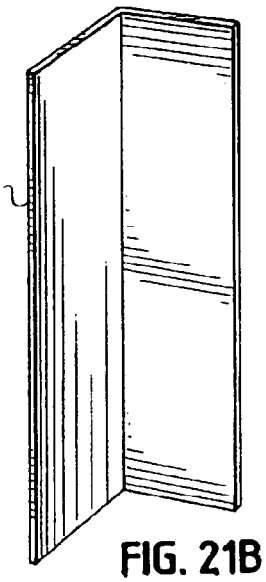

FIGS. 21A and 21B show a window trim piece 410 of the present invention. This piece is used to provide a transition from wall drywall to a window. This piece is similar to other embodiments with two substantially flat flanges 420 forming an approximate 90 degree angle or other specialty angle of any number of degrees. The actual angle 428 is chosen around 89 degrees for a right angle system for reasons previously explained. Again a semi-rigid member 412 is used inside the flanges 420 for rigidity. As in other embodiments, this piece can be plastic or other rigid material. It is used to give strength and shape to the piece. One of the flanges contains a spacer 421 of the type previously described. This spacer is used to eliminate the need to wrap the opening with drywall. The window piece is constructed so that one flange 420 is from around 1 to around 7 inches, with around 2¼ inches being typical. The other flange may be shorter to fit a window, with a typical width being from around 1 inches to around 12 inches with 6 inches preferred. The piece can be supplied with several different sized flanges to fit different construction situations. The semi-rigid member 412 is preferably tapered for easy feathering by the worker. The support member can be from about 5 inches on a 7 inch flange and can take a similar ratio on a different sized flange. The spacer 421 can be any durable material, and can be around ⅜ inch thick. Other sizes are possible to match the needs of the construction. The length of the piece can be a standard 8 or 10 foot, or any other length dictated by the construction.

Figure 22:
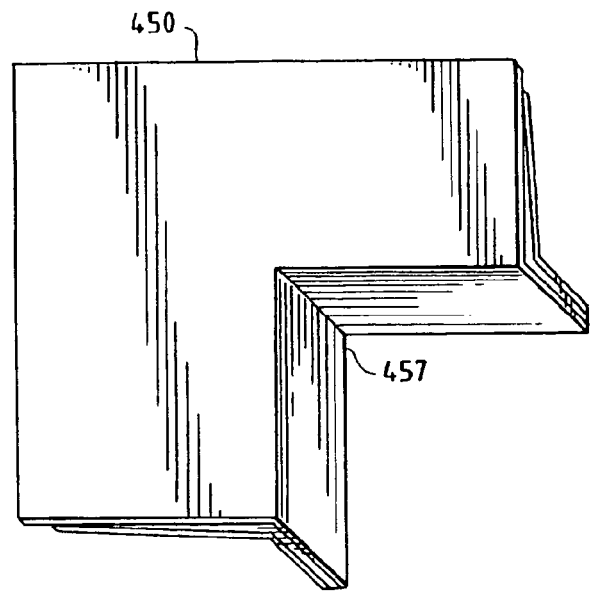
FIG. 22 shows a ninth embodiment comprising a specialty piece for window trim.

FIG. 22 shows a specialty trim piece 450 which is an embodiment of the invention similar to that shown in FIG. 20 except that this embodiment is specially shaped to continue the window trim piece of FIG. 21. Here, there is only one side 460 at fits the window corner. A right angle extension 461 follows the shape of the window corner. The flanges 460 are preferably tapered to a thin outer edge 466 to make feathering easier. The corner 457 can be sharp edged as shown or bullnosed or any other shape. The exterior angles for right angle construction are around 89 degrees as in the previously described embodiments.

Figure 23A:
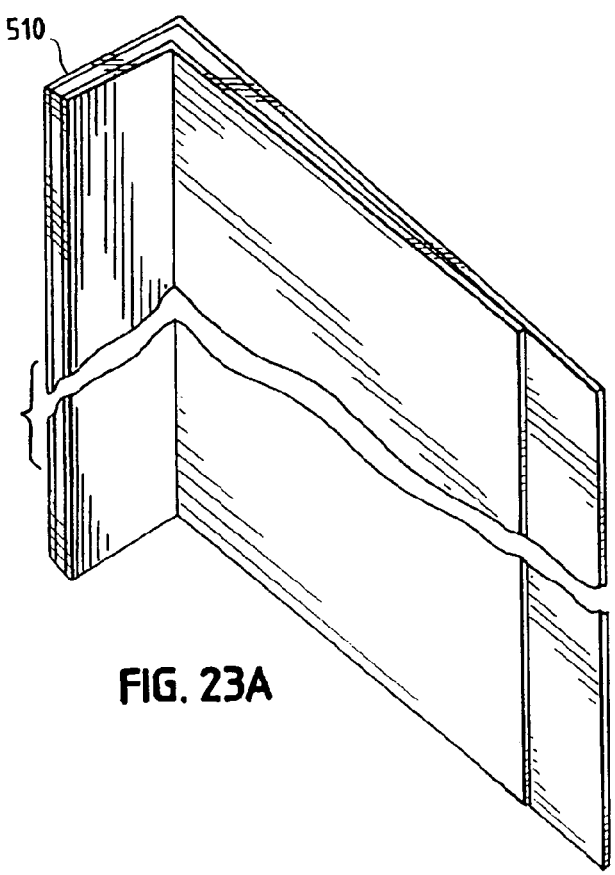
FIGS. 23A and 23B show a tenth embodiment comprising an L-member piece.
Figure 23B:
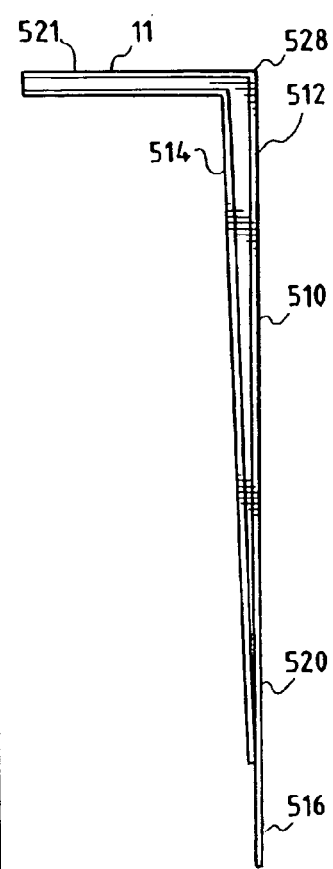

FIGS. 23A and 23B show a L-member embodiment 510 of the present invention. This piece is used under window sills, or wherever drywall abruptly ends such as an interface with brick. It is constructed like the previously described embodiments. Even though the piece is being referred to as an L-metal or L-trim, this does not imply that any actual metal is used in its construction. There is a wide flange 520 and a narrow flange 521. The narrow flange can be from around ¼ inch to greater than 1 inch. The wide flange can be from 1 inch to over 6 inches. Again the length of the piece can be the standard 8 or 10 foot, or any length dictated by the construction. The semi-rigid member 512 is very similar to the support members of the previously described embodiments. The finishing material 516 can be paper; however, the preferred method for this piece is to use paper covered plastic for shape and strength. As before, the outside corner 528 can be straight, bullnose, or other shape.

Figure 24A:
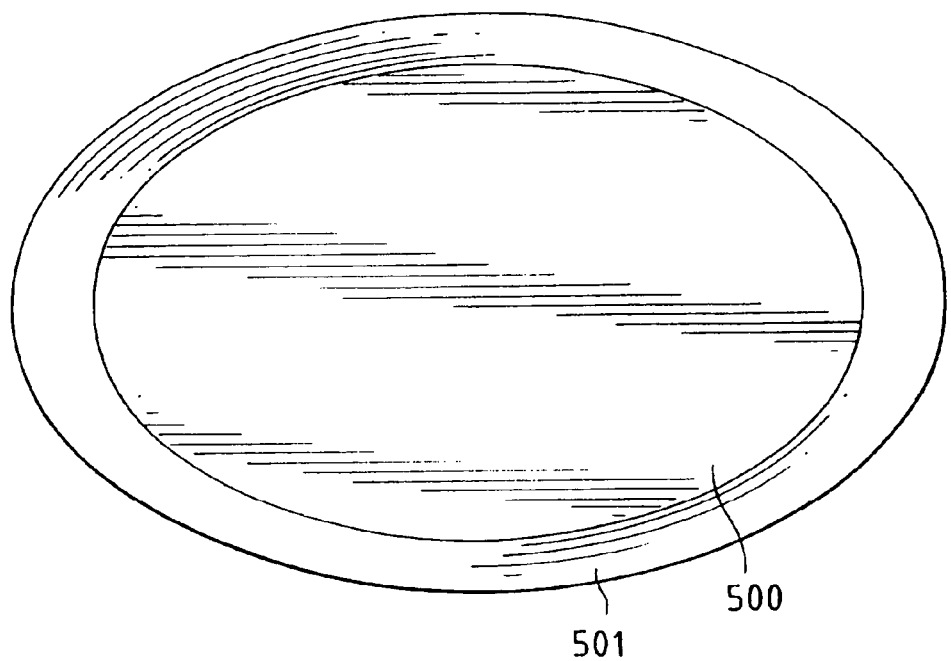
FIGS. 24A and 24B show an elliptical, no-coat wall patch.
Figure 24B:
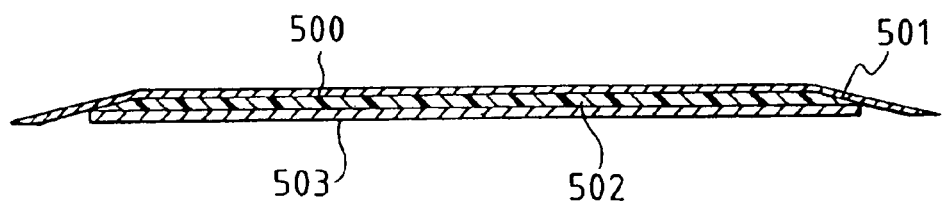

FIGS. 24A and 24B show an elliptical, no-coat wall patch. This feature is an embodiment of the present invention for patching holes in drywall board. The semi-rigid member 502 is very similar to the support members of the previously described embodiments. The piece is tapered 501 for feathering and finishing as previously described in other embodiments. The back 503 is made of a fibrous material similar to the paper used in drywall tape, while the outer exposed surface 500 is made of a fibrous material suitable for directly receiving paint or texture as in other described embodiments. As with other embodiments, the finished or outer exposed surface 500 overlaps the piece for feathering.

Figure 25:
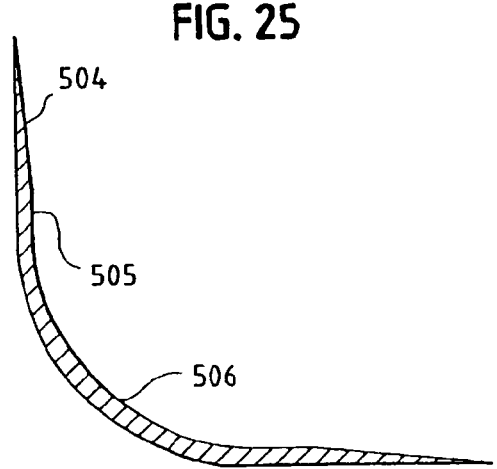
FIG. 25 is a cross section of a rigid bull-nose embodiment of the present invention.

FIG. 25 is a cross section of a rigid bull-nose embodiment of the present invention. This embodiment is similar to bull-nose embodiments previously described with a curved section 506 and a tapered flange 504. However, this embodiment contains a portion of the cross section 505 that is of constant thickness and straight for around ½ inch from the end of the taper until the curve begins. This feature prevents drywall mud from going into the curved or radius portion 506.

Figure 26:
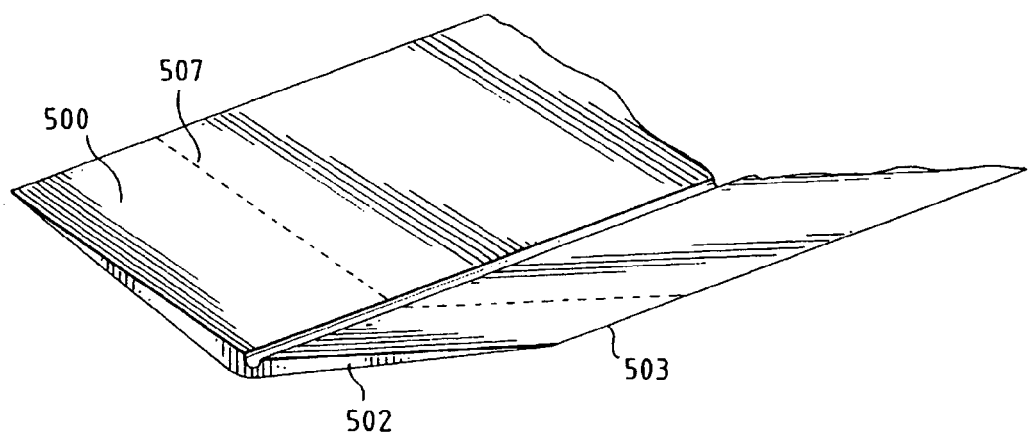
FIG. 26 shows a method for joining pieces of flex-trim end-to-end.

FIG. 26 shows a method for joining pieces of flex-trim end-to-end. The unfinished surface of the piece 503 is stamped laterally 507 across its width. This stamp 507 partially penetrates into the semi-rigid support member 502. This stamp allows part of the non-finishing material 503 and the semi-rigid member 502 to be removed for end-to-end joining. The non-finishing material and semi-rigid material is simply removed and the pieces are butted. The resulting seam can easily be finished with a small amount of drywall mud.

While the preferred embodiments of the present invention have been shown and described, it is to be understood that various modifications and changes could be made thereto without departing from the scope of the appended claims.

What is claimed is:

1. A flexible drywall trim piece having width and length comprising:
    a continuously extruded semi-rigid elongated plastic member having an approximately right angle bend at approximately one-third of said width and an end-to-end hinge at approximately two-thirds of said width, said bend together with said hinge defining a fixed flange portion, a fixed center region, and a hinged flange portion;
    said hinged flange repeatably adjustable about said hinge without substantially fatiguing said hinge to a plurality of angles between approximately 15 degrees to approximately 340 degrees, said angles measured between said fixed center region and said hinged flange;
    said elongated plastic member having two outside end-to-end edges, said fixed flange and said hinged flange being tapered toward said outside edges;
    top and bottom paper layers substantially covering said elongated plastic member;
    an adhesive layer on an exterior surface of one of said paper layers.

2. The drywall trim piece of claim 1 wherein said elongated plastic member is high-impact plastic.

3. The drywall trim piece of claim 1 wherein at least one of said paper layers is cup stock paper.

* * * * *